United States Patent
Wheeler et al.

(10) Patent No.: US 10,487,562 B2
(45) Date of Patent: Nov. 26, 2019

(54) SYSTEMS AND METHODS FOR MITIGATING OPEN VEHICLE WINDOW THROB

(71) Applicant: Ford Global Technologies, LLC, Dearborn, MI (US)

(72) Inventors: Joshua Wheeler, Trenton, MI (US); William S. Gulker, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 148 days.

(21) Appl. No.: 15/784,434

(22) Filed: Oct. 16, 2017

(65) Prior Publication Data

US 2019/0112861 A1 Apr. 18, 2019

(51) Int. Cl.
| | |
|---|---|
| *E05F 15/71* | (2015.01) |
| *E05F 15/695* | (2015.01) |
| *B60J 1/00* | (2006.01) |
| *E05F 15/73* | (2015.01) |

(52) U.S. Cl.
CPC ............... *E05F 15/71* (2015.01); *B60J 1/00* (2013.01); *E05F 15/695* (2015.01); *E05F 2015/763* (2015.01); *E05Y 2400/42* (2013.01); *E05Y 2400/44* (2013.01); *E05Y 2800/422* (2013.01); *E05Y 2900/55* (2013.01)

(58) Field of Classification Search
CPC .......... E05Y 2400/44; E05Y 2800/422; E05F 15/695; E05F 15/70; E05F 15/71
See application file for complete search history.

(56) References Cited

U.S. PATENT DOCUMENTS

| | | | | |
|---|---|---|---|---|
| 5,045,765 A | * | 9/1991 | Wissler | B60H 1/00742 296/223 |
| 6,820,897 B2 | * | 11/2004 | Breed | B60R 21/015 280/735 |
| 7,641,275 B2 | * | 1/2010 | Campbell | B60J 1/20 296/180.1 |
| 7,877,180 B2 | | 1/2011 | Turner et al. | |
| 7,974,755 B2 | | 7/2011 | Campbell et al. | |
| 10,119,321 B2 | * | 11/2018 | Bulpitt | E05F 15/695 |
| 2007/0188122 A1 | | 8/2007 | Andrejciw | |
| 2009/0069984 A1 | * | 3/2009 | Turner | E05F 15/71 701/49 |
| 2010/0057465 A1 | * | 3/2010 | Kirsch | G01C 21/3629 704/260 |

(Continued)

FOREIGN PATENT DOCUMENTS

| | | |
|---|---|---|
| DE | 102007028311 A1 | 1/2009 |
| DE | 102016010352 A1 | 2/2017 |
| JP | 09078940 A | 3/1997 |

*Primary Examiner* — Justin B Rephann
(74) *Attorney, Agent, or Firm* — Frank Lollo; Eversheds Sutherland (US) LLP

(57) ABSTRACT

Method and apparatus are disclosed for determining and mitigating wind throb caused by an open vehicle window. An example vehicle includes a plurality of windows corresponding to a plurality of seats having respective occupancy sensors, a microphone, and a processor. The processor is configured to determine that a first window is open, determine, based on microphone data, that a sound pressure level is above a threshold level, and responsively open a second window selected based on occupancy data determined by the occupancy sensors.

20 Claims, 3 Drawing Sheets

(56) References Cited

U.S. PATENT DOCUMENTS

2015/0358727 A1   12/2015  Rizzo et al.
2016/0234594 A1*  8/2016  Ogura ................ B60R 11/0247
2017/0362877 A1*  12/2017  Bars ..................... E05F 15/689

* cited by examiner

SYSTEMS AND METHODS FOR MITIGATING OPEN VEHICLE WINDOW THROB

TECHNICAL FIELD

The present disclosure generally relates vehicle passenger comfort and, more specifically, systems and methods mitigating open vehicle window throb.

BACKGROUND

Many modern vehicles are designed to be aerodynamic to minimize drag and improve fuel economy. When these vehicles are travelling at a given speed, a rolled down window can disrupt the aerodynamic properties of the vehicle. Also, the window can cause a pressure differential to occur, resulting in a throb or buffeting sensation that may be unpleasant for passengers in the vehicle.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown describing systems, apparatuses, and methods for detecting and mitigating wind throb caused by an open vehicle window. An example disclosed vehicle includes a plurality of windows corresponding to a plurality of seats having respective occupancy sensors, a microphone, and a processor. The processor is configured to determine that a first window is open, determine, based on microphone data, that a sound pressure level is above a threshold level, and responsively open a second window selected based on occupancy data determined by the occupancy sensors.

An example disclosed method includes determining that a first window of a vehicle having a plurality of windows is open, the plurality of windows corresponding to a plurality of vehicle seats having respective occupancy sensors. The method also includes determining, based on vehicle microphone data, that a sound pressure level is above a threshold. And the method further includes responsively opening a second window based on occupancy data determined by the occupancy sensors.

A third example may include means for determining that a first window of a vehicle having a plurality of windows is open, the plurality of windows corresponding to a plurality of vehicle seats having respective occupancy sensors. The third example also includes means for determining, based on vehicle microphone data, that a sound pressure level is above a threshold. And the third example further includes means for responsively opening a second window based on occupancy data determined by the occupancy sensors.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
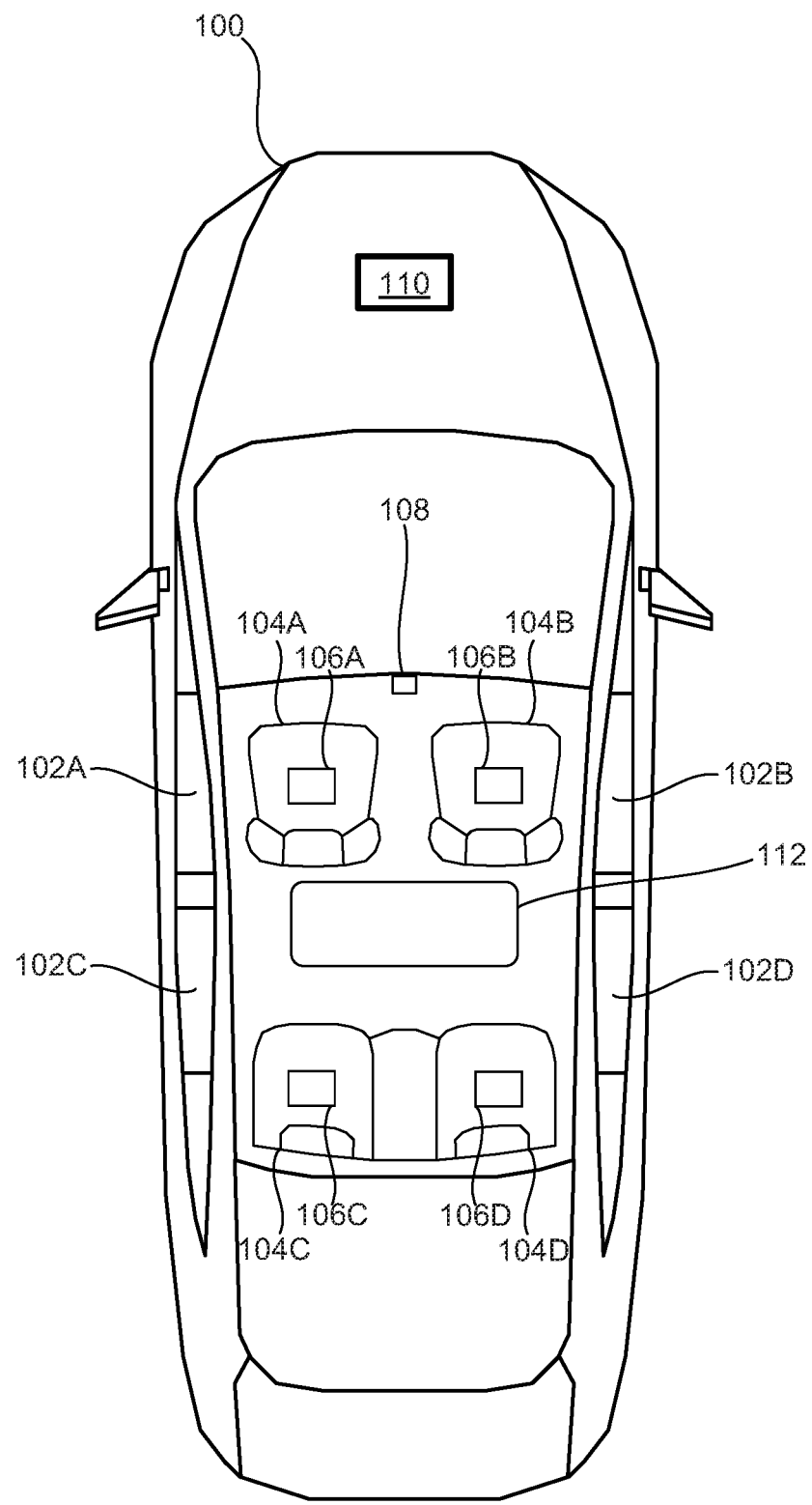
FIG. 1 illustrates an example vehicle according to embodiments of the present disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As noted above, passengers present inside a vehicle may experience wind throb or buffeting caused by an open vehicle window. This may be due to the laminar airflow around the vehicle being disrupted by an open window, creating a pulsing or throbbing pressure differential that may manifest as an uncomfortable throb in a passenger's ear. This effect is particularly noticeable when there is only one open window in the vehicle, and when the vehicle is travelling at a high speed. Specifically, the effect may be noticeably more prominent when a rear window of the vehicle is open, due to the aerodynamics of the vehicle and inner cabin.

In some examples, various vehicle structural modifications may be made to reduce the effect of wind throb. For instance, the vehicle side mirrors may be positioned to disrupt the flow of air past the windows. However, positioning the side mirrors may only affect flow over the front windows, while not affecting the rear windows. Further, the shape of the windows may affect the amount of wind throb that results from an open window. Other structural modifications may include adding deflectors or other changes to the aerodynamic structure that may increase manufacturing costs and complexity.

In some examples, wind throb may be reduced by opening a second window of the vehicle. However, a given passenger experiencing wind throb may not have access to a second window, and/or may not realize that opening the second window may reduce the wind throb. For instance, increased prevalence of autonomous vehicles may lead to situations where there is no passenger in the driver's seat, and thus no person who has control of all the windows. And further, enabling each seat of the vehicle to control all the vehicle windows may increase manufacturing costs and complexity.

With these issues in mind, example embodiments of the present disclosure may provide an active control of one or more vehicle windows in order to detect and automatically reduce wind throb. When a first window is rolled down, a vehicle microphone may be used to determine a sound pressure level. Wind throb may be most prominent in the range of 0-50 Hz, which may cause discomfort to a passenger. If the microphone detects a sound pressure level in the range of 0-50 Hz at above a threshold level (e.g., 115 dB), that may indicate that there is wind throb present. In response, a processor of the vehicle may determine that a second window should be rolled down to reduce the wind throb. The second window may be selected based on its proximity to the first window, because opening the nearest window to the first window may be the most effective at reducing the sound pressure level from wind throb. In some examples this may include a priority given to the window on the same side of the vehicle as the first window. But where a passenger is present in a seat corresponding to the nearest window, a different window may be selected in order to not disturb the passenger or over-ride his or her decision to keep the window closed.

FIG. 1 illustrates an example vehicle 100 according to some embodiments. Vehicle 100 may be a standard gasoline powered vehicle, a hybrid vehicle, an electric vehicle, a fuel cell vehicle, or any other mobility implement type of vehicle. Vehicle 100 may be non-autonomous, semi-autonomous, or autonomous. Vehicle 100 may include parts related to mobility, such as a powertrain with an engine, a transmission, a suspension, a driveshaft, and/or wheels, etc. In the illustrated example, vehicle 100 may include one or more electronic components (described below with respect to FIG. 2).

As shown in FIG. 1, vehicle 100 may include a plurality of windows 102A-D corresponding to a plurality of seats 104A-D. And each seat 104A-D may have a corresponding occupancy sensor 106A-D. Vehicle 100 may also include a microphone 108, a processor 110, and a sunroof 112.

Windows 102A-D may be configured to be open or closed, and may include one or more sensors that indicate a status of the window (i.e., open or closed) as well as an amount or distance that the window is opened. In some examples, vehicle 100 may include four windows 102A-D, which may include the left front window 102A, right front window 102B, left rear window 102C and right rear window 103D. In other examples, there may be may be more or fewer windows, such as where vehicle 100 is a bus, van, or other larger vehicle. Vehicle 100 may also include a sunroof 112, and where vehicle 100 is a larger vehicle there may be two or more sunroofs.

Seats 104A-D of vehicle 100 may correspond respectively to windows 102A-D. In some examples, vehicle 100 may include one seat for each window. In other examples, there may be two or more seats for a given window (e.g., on a bus or large vehicle). Occupancy sensors 106A-D may correspond to each seat, and may be configured to indicate whether a person is present in each seat. Occupancy sensors 106A-D may include one or more pressure sensors, ultrasonic sensors, cameras, accelerometers, or other sensors configured to determine when a person is present.

Microphone 108 of vehicle 100 may be an active noise cancellation (ANC) microphone. The ANC microphone may be used in combination with processor 110 to reduce a sound from the engine, vibrations from the vehicle, or to otherwise reduce the noise inside the vehicle cabin. As such, the ANC microphone may be tuned or configured to detect and pick up low frequency signals such as those from 0-50 Hz. Alternatively, microphone 108 may be an automatic speech recognition (ASR) microphone used for hands free communication.

Microphone 108 may be a single microphone, or may include two or more microphones in an array. Further, microphone(s) 108 may be positioned in one location within vehicle 100, or may be distributed in two or more locations throughout a cabin of vehicle 100. In one example, the microphone 108 is positioned in a center console of the vehicle 100.

Processor 110 may be configured to carry out one or more functions or actions described herein. For example, processor 110 may receive data from one or more sensors or other devices or systems described herein, make one or more determinations, and control one or more other devices or systems.

In some examples, processor 110 may be configured to determine that a first window of vehicle 100 is open. Vehicle 100 may include one or more sensors coupled to the windows 102A-D that may provide information about the status of the windows. For instance, this may include whether a given window is open or closed, how far rolled down the window is, and/or timing information about when the window was rolled down, for example. Based on this information, processor 110 may determine that one or more of the windows 102A-D of vehicle 100 are open.

Processor 110 may also be configured to determine a speed of vehicle 100, and determine that the first window is open while the vehicle is travelling above a threshold speed. In some examples, determining that the vehicle speed is above the threshold speed may be done responsive to determining that the first window is open.

Where it is determined that the speed is below the threshold speed, processor 110 may take no further action with respect to a second window.

But if is determined that the vehicle speed is above the threshold speed, processor 110 may take one or more further actions such as those described in further detail below. It should be noted that one example threshold speed may be twenty miles per hour. However it should also be noted that other threshold speed may be used as well, including those speed that are both greater than and less than twenty miles per hour.

Processor 110 may further be configured to determine that a sound pressure level (SPL) in a cabin of vehicle 100 is above a threshold level. The determination of the SPL may be done based on data captured by the microphone 108. In some examples, the determination may be done to measure an SPL at a particular location within the vehicle cabin. For instance, a location near a head of one or more passengers, or at a location in a center of the vehicle cabin.

After the SPL is determined, processor 110 may compare the determined SPL to one or more thresholds. The threshold(s) may be a decibel (dB) level corresponding to a particular range of frequencies. For example, in the range of 0-50 Hz the threshold may be 115 dB. This can be understood to mean that if any frequency in the range of 0-50 Hz is measured to be above 115 dB then the threshold is met. It should be noted that other frequency ranges and dB levels may be used as well. Further, a higher SPL may correspond to more wind throb, and thus greater likely passenger discomfort.

Processor 110 may also be able to determine vehicle occupancy based on data from occupancy sensors. Vehicle occupancy may include determining that one or more seats are occupied, and which particular seats are occupied.

Responsive to determining that the SPL is above the threshold level, processor 110 may open a second window based on occupancy data determined by the occupancy sensors 106A-D. This may include determining the second seat based on sensor data, and the opening a second window that corresponds to the second seat.

The second seat may be determined by determining a first seat corresponding to the first (open) window, and determining a second seat that is nearby the first seat. This may include prioritizing a seat on the same side of the vehicle. For instance, where the first seat is the rear left seat 104C, the second seat may determined to be the front left seat 104A. In some examples, determining a seat that is nearby may include prioritizing the same side of the vehicle. As such, the left front window 102A may be closer to the left rear window 102C than to the right front window 102B or the right rear window 102D. Alternatively it may include prioritizing the same front to back location of the vehicle. In this case, the left rear window 102C may be closer to the right rear window 102D than to the left front window 102A or the right front window 102B.

Determining the second seat may include selecting the nearest unoccupied seat. For instance, in the same example above where the first seat is the left rear seat 104C, the closest seat may be determined to be the left front seat 104A. But where the left front seat 104A is occupied, the second seat may instead be determined to be the rear right seat 104D. As such, there may be a priority list that is traversed by processor 110 based on whether a nearest seat is occupied or not, and whether the next closest seat is also occupied.

If all seats 104A-D are occupied, the second window may be determined to be a sunroof 112. In this case, the processor 110 may select the sunroof as the second window and responsively open the second window.

Processor 110 may further be configured to open the second window by a predetermined amount responsive to determining that the SPL is above a threshold level. The predetermined amount may be two or three inches in some examples, but may also be a larger or smaller amount. In some examples, the make and model of the vehicle may affect the predetermined amount, such that a first vehicle may have a predetermined amount of two inches while a second vehicle of a different make and model has a predetermined amount of 3 inches. The various amounts may depend on the aerodynamics of the particular vehicle.

In some examples, processor 110 may be configured to open the second window by an amount similar to or identical to an amount the first window is open. In this case, the processor 110 may determine a first distance that the first window is open, and responsively open the second window by a second distance that matches, is similar to, or is identical to the first distance.

In some examples, the processor may be configured to adjust or modify the distance that the second window is open based on feedback and/or additional SPL determinations. For instance, the processor 110 may open the second window by a first amount responsive to the first SPL determination being greater than the threshold. The processor may then determine a second SPL after the second window has been opened, and responsively open or close the second window by a second amount based on the difference in SPL between the first and second measurements. Opening the second window by the first amount may reduce the SPL slightly, but the SPL may still be above the threshold. As such, the processor 110 may determine that the second window should be opened further to reduce the SPL further, and bring the SPL below the threshold. The further amount that the second window is opened or closed may depend on or be based on a difference between a first SPL measured while the second window is closed, and a second SPL measured when the second window is opened by the first amount.

In some examples the amount that the second window is opened may depend on a vehicle speed. For instance, when the vehicle is travelling slowly, the second window may be opened a greater distance than if the vehicle is travelling at a high speed. In some examples the alternative may be true.

Processor 110 may further be configured to provide an alert or message to the passenger(s) of vehicle 100 indicating that the second window has been rolled down to reduce the SPL in the vehicle.

Figure 2:
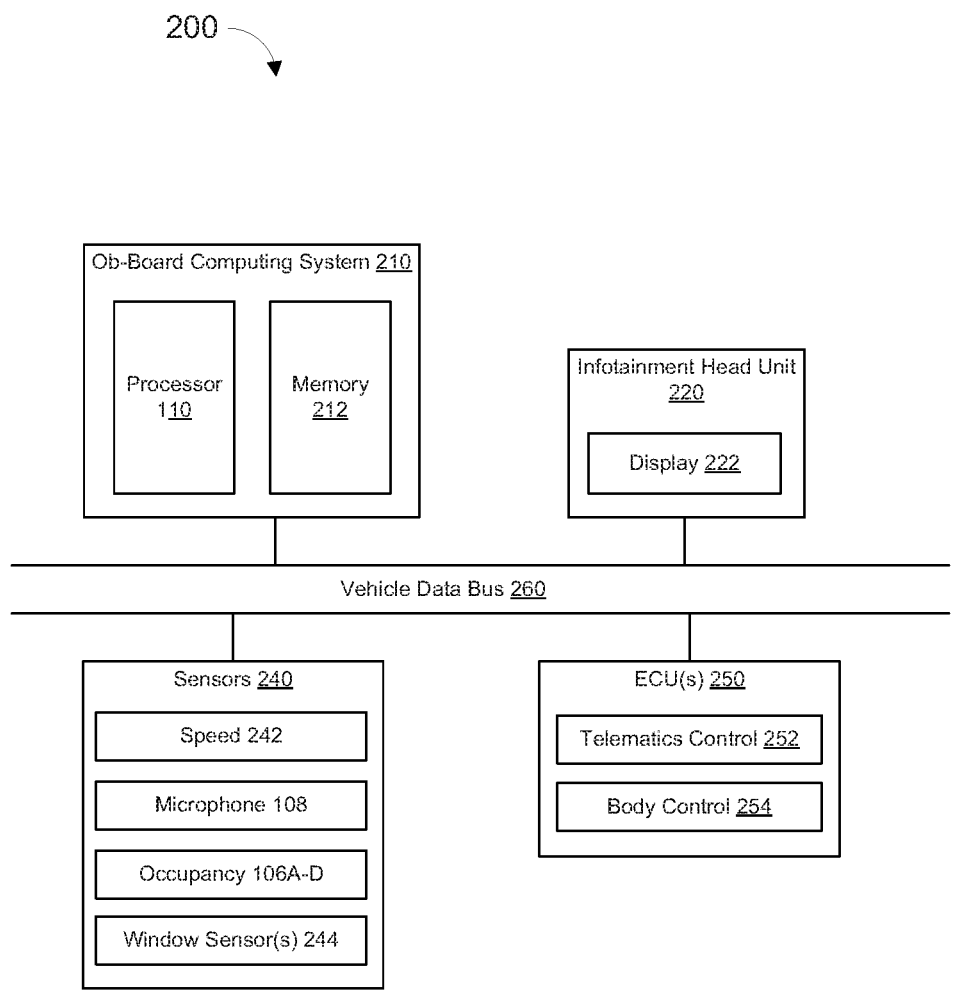
FIG. 2 illustrates an example block diagram of electronic components of the vehicle of FIG. 1.

FIG. 2 illustrates an example block diagram 200 showing electronic components of vehicle 100, according to some embodiments. In the illustrated example, the electronic components 200 include the on-board computing system 210, infotainment head unit 220, sensors 240, electronic control unit(s) 250, and vehicle data bus 260.

The on-board computing system 210 may include a microcontroller unit, controller or processor 110 and memory 212. Processor 110 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 212 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 212 includes multiple kinds of memory, particularly volatile memory and non-volatile memory.

The memory 212 may be computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 212, the computer readable medium, and/or within the processor 110 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 220 may provide an interface between vehicle 100 and a user. The infotainment head unit 220 may include one or more input and/or output devices. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display (LCD), an organic light emitting diode (OLED) display, a flat panel display, a solid state display, etc.), and/or speakers. In the illustrated example, the infotainment head unit 220 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). In some examples the infotainment head unit 220 may share a processor with the on-board computing system 210. Additionally, the infotainment head unit 220 may display the infotainment system on, for example, a center console display 222 of vehicle 100.

Sensors 240 may be arranged in and around the vehicle 100 in any suitable fashion. In the illustrated example, sensors 240 include a speed sensor 242, microphone 108, occupancy sensors 106A-D, and one or more window sensor(s) 244. Other sensors may be included as well.

The ECUs 250 may monitor and control subsystems of vehicle 100. ECUs 250 may communicate and exchange information via vehicle data bus 260. Additionally, ECUs 250 may communicate properties (such as, status of the ECU 250, sensor readings, control state, error and diagnostic codes, etc.) to and/or receive requests from other ECUs 250. Some vehicles 100 may have seventy or more ECUs 250 located in various locations around the vehicle 100 communicatively coupled by vehicle data bus 260. In some examples, on-board computing system 210 may be one of the many ECUs. ECUs 250 may be discrete sets of electronics that include their own circuit(s) (such as integrated circuits, microprocessors, memory, storage, etc.) and firmware, sensors, actuators, and/or mounting hardware. In the illustrated example, ECUs 250 may include the telematics control unit 252 and the body control unit 254.

The telematics control unit 252 may control tracking of the vehicle 100, for example, using data received by a GPS receiver, a communication module, and/or one or more sensors. The body control unit 254 may control various subsystems of the vehicle 100. For example, the body control unit 254 may control power a trunk latch, windows, power locks, power moon roof control, an immobilizer system, and/or power mirrors, etc. Other ECUs are possible as well.

Vehicle data bus 260 may include one or more data buses that communicatively couple the on-board computing system 210, infotainment head unit 220, sensors 240, ECUs 250, and other devices or systems connected to the vehicle data bus 260. In some examples, vehicle data bus 260 may be implemented in accordance with the controller area network (CAN) bus protocol as defined by International Standards Organization (ISO) 11898-1. Alternatively, in some examples, vehicle data bus 260 may be a Media Oriented Systems Transport (MOST) bus, or a CAN flexible data (CAN-FD) bus (ISO 11898-7).

Figure 3:
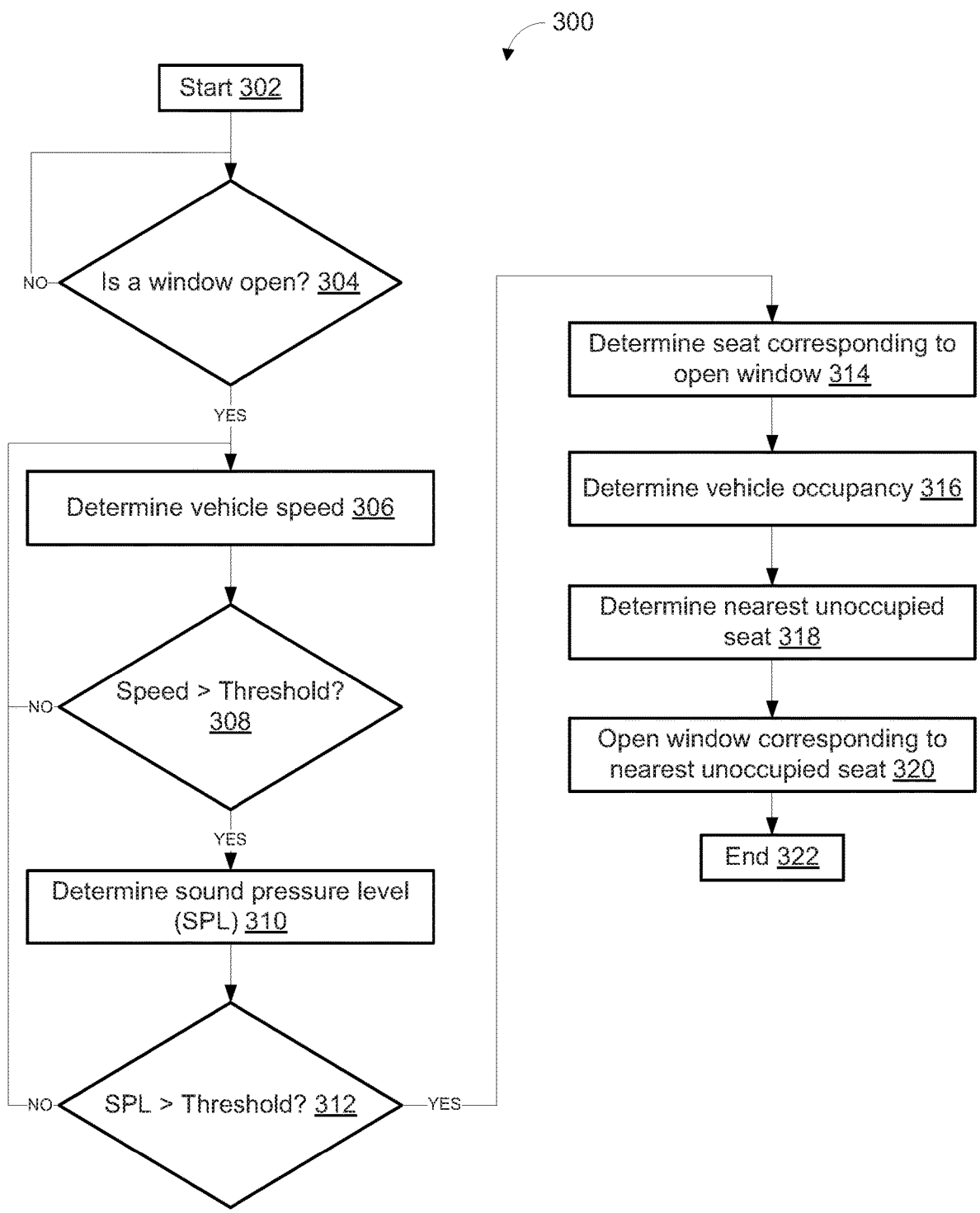
FIG. 3 illustrates a flowchart of an example method according to embodiments of the present disclosure.

FIG. 3 illustrates an example method 300 according to embodiments of the present disclosure. Method 300 may enable a vehicle to detect and mitigate wind throb due to an open window. The flowchart of FIG. 3 is representative of machine readable instructions that are stored in memory (such as memory 212) and may include one or more programs which, when executed by a processor (such as processor 110) may cause vehicle 100 and/or one or more systems or devices to carry out one or more functions described herein. While the example program is described with reference to the flowchart illustrated in FIG. 3, many other methods for carrying out the functions described herein may alternatively be used. For example, the order of execution of the blocks may be rearranged or performed in series or parallel with each other, blocks may be changed, eliminated, and/or combined to perform method 300. Further, because method 300 is disclosed in connection with the components of FIGS. 1-2, some functions of those components will not be described in detail below.

Method 300 may start at block 302. At block 304, method 300 may include determining whether a first window has been opened. This may be done by a vehicle processor, using information received from one or more vehicle sensors.

If a first window has been opened, method 300 may include determining a vehicle speed at block 306. At block 508, method 300 may include determining whether the vehicle speed is above or below a threshold speed. If the vehicle speed is below the threshold, method 300 may return to block 306.

If the vehicle speed is greater than the threshold speed, method 300 may include determining a sound pressure level (SPL). This may include using one or more microphones inside a cabin of the vehicle.

At block 312, method 300 may include determining whether the SPL is greater than a threshold level. If the determined SPL is below the threshold, method 300 may return to block 306. But if the determined SPL is greater than the threshold level, method 300 may proceed to block 314.

At block 314, method 300 may include determining a seat corresponding to the open window. Method 300 may then include determining vehicle occupancy at block 316. This may include a vehicle processor receiving data from one or more sensors of the vehicle, in order to determine whether each seat of the vehicle is occupied or not.

At block 318, method 300 may include determining a nearest unoccupied seat. The nearest unoccupied seat may be determined based on a priority list, wherein for a given seat each other seat in the vehicle is ranked. For instance, if the first seat is the rear left seat in a four seat vehicle, the nearest seat may be the front left seat. The next nearest seat may be the right rear seat. And the next nearest seat may be the right front seat. Block 318 may further include comparing the occupancy information with the list or priority of seats, to determine a nearest seat that is not occupied.

At block 320, method 300 may then include opening a window corresponding to the nearest unoccupied seat. This may include opening the window by a predetermined or set amount, opening the window to match an amount by which the first window has been opened, or opening the second window based on a vehicle speed. Further, the second window may be opened an initial or first amount, and then opened a further amount based on feedback and/or one or more other SPL determinations. Method 300 may then end at block 322.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
a plurality of windows corresponding to a plurality of seats having respective occupancy sensors;
a microphone; and
a processor configured to:
determine that a first window of the plurality of windows is open;
determine, based on microphone data, that a sound pressure level is above a threshold level; and
responsively open a second window selected based on occupancy data determined by the occupancy sensors.

2. The vehicle of claim 1, wherein the microphone is an active noise cancellation microphone positioned in a vehicle cabin.

3. The vehicle of claim 1, wherein the processor is further configured to determine that the first window is open while the vehicle is travelling above a threshold speed.

4. The vehicle of claim 1, wherein the processor is further configured to determine that the sound pressure level is below 50 Hz and is greater than 115 decibels.

5. The vehicle of claim 1, wherein the processor is further configured to:
determine a first seat of the plurality of seats corresponding to the first window;
determine, based on the first seat and the occupancy data, a nearest unoccupied seat of the plurality of seats; and
responsively open the second window, wherein the second window corresponds to the nearest unoccupied seat.

6. The vehicle of claim 1, wherein the processor is further configured to open the second window by two inches.

7. The vehicle of claim 1, wherein the processor is further configured to:
determine a first distance that the first window is open; and
open the second window a second distance that matches the first distance.

8. The vehicle of claim 1, wherein the sound pressure level is a first sound pressure level, and wherein the processor is further configured to:
open the second window by a first amount;
responsively determine a second sound pressure level after the second window has been opened by the first amount; and
open the second window by a second amount based on a difference between the first sound pressure level and the second sound pressure level.

9. The vehicle of claim 1, wherein the processor is further configured to determine a vehicle speed, and open the second window by an amount corresponding to the vehicle speed.

10. The vehicle of claim 1, wherein the processor is further configured to determine that the plurality of seats are occupied, wherein the second window is a sunroof.

11. A method comprising:
determining that a first window of a plurality of windows is open, of a vehicle having the plurality of windows, the plurality of windows corresponding to a plurality of vehicle seats having respective occupancy sensors;
determining, based on vehicle microphone data, that a sound pressure level is above a threshold; and
responsively opening a second window based on occupancy data determined by the occupancy sensors.

12. The method of claim 11, wherein the microphone data is captured by an active noise cancellation microphone positioned in a cabin of the vehicle.

13. The method of claim 11, further comprising determining that the first window is open while the vehicle is travelling above a threshold speed.

14. The method of claim 11, further comprising determining that the sound pressure level is below 50 Hz and is greater than 115 decibels.

15. The method of claim 11, further comprising:
determining a first vehicle seat of the plurality of vehicle seats, corresponding to the first window;
determining, based on the first vehicle seat of the plurality of vehicle seats, and the occupancy data, a nearest unoccupied seat of the plurality of vehicle seats; and
responsively opening the second window, wherein the second window corresponds to the nearest unoccupied seat of the plurality of vehicle seats.

16. The method of claim 11, further comprising opening the second window by two inches.

17. The method of claim 11, further comprising:
determining a first distance that the first window is open; and
opening the second window a second distance that matches the first distance.

18. The method of claim 11, wherein the sound pressure level is a first sound pressure level, the method further comprising:
opening the second window by a first amount;
responsively determining a second sound pressure level after the second window has been opened by the first amount; and
opening the second window by a second amount based on a difference between the first sound pressure level and the second sound pressure level.

19. The method of claim 11, further comprising determining a vehicle speed, and opening the second window by an amount corresponding to the vehicle speed.

20. The method of claim 11, further comprising determining that the plurality of vehicle seats are occupied, and responsively opening a sunroof.

* * * * *